US008930524B2

(12) United States Patent
Asai et al.

(10) Patent No.: US 8,930,524 B2
(45) Date of Patent: Jan. 6, 2015

(54) STATUS REPORTING APPARATUS, IMAGE PROCESSING SYSTEM, AND STORAGE MEDIUM STORING CONTROL PROGRAM

(75) Inventors: Takahiro Asai, Kanagawa-ken (JP); Naoki Umehara, Yokohama (JP)

(73) Assignee: Ricoh Company, Limited, Tokyo (JP)

( * ) Notice: Subject to any disclaimer, the term of this patent is extended or adjusted under 35 U.S.C. 154(b) by 526 days.

(21) Appl. No.: 12/573,431

(22) Filed: Oct. 5, 2009

(65) Prior Publication Data

US 2010/0088408 A1 Apr. 8, 2010

(30) Foreign Application Priority Data

Oct. 6, 2008 (JP) ................................. 2008-259686
Sep. 8, 2009 (JP) ................................. 2009-207354

(51) Int. Cl.
*G06F 15/173* (2006.01)
*G06F 11/30* (2006.01)
*H04N 1/00* (2006.01)
*G06F 3/12* (2006.01)

(52) U.S. Cl.
CPC ........ *G06F 11/3013* (2013.01); *G06F 11/3055* (2013.01); *G06F 11/3086* (2013.01); *H04N 1/00344* (2013.01); *G06F 3/1204* (2013.01); *G06F 3/1207* (2013.01); *G06F 3/1229* (2013.01); *G06F 3/1259* (2013.01); *G06F 3/1285* (2013.01); *H04N 2201/0072* (2013.01); *G06F 3/1286* (2013.01)
USPC ........... 709/224; 358/1.14; 358/1.15; 714/44; 714/48

(58) Field of Classification Search
USPC .......... 709/223–227, 201–203, 200; 714/2, 5, 714/26–27, 44–48, 57; 358/1.14–1.15; 726/26–30
See application file for complete search history.

(56) References Cited

U.S. PATENT DOCUMENTS

| 5,155,842 A * | 10/1992 | Rubin ............................. 714/22 |
| 6,970,925 B1 * | 11/2005 | Springmeyer et al. ........ 709/224 |
| 2005/0018242 A1 * | 1/2005 | Azami .......................... 358/1.15 |
| 2005/0162693 A1 * | 7/2005 | Torii ............................. 358/1.15 |
| 2006/0039024 A1 * | 2/2006 | Iida et al. ..................... 358/1.14 |

(Continued)

FOREIGN PATENT DOCUMENTS

| JP | 11-314439 | 11/1999 |
| JP | 2006-295883 | 10/2006 |
| JP | 2008-97582 A | 4/2008 |
| JP | 2008-233994 A | 10/2008 |

OTHER PUBLICATIONS

Office Action issued Aug. 6, 2013, in Japanese Patent Application No. 2009-207354.

*Primary Examiner* — Greg C Bengzon
(74) *Attorney, Agent, or Firm* — Oblon, Spivak, McClelland, Maier & Neustadt, L.L.P.

(57) ABSTRACT

A status reporting apparatus for reporting a status of an image processing apparatus operating in connection with a network includes a status detector, a status report destination information obtainer, and a status reporting unit. The status detector detects a status of the image processing apparatus. The status report destination information obtainer obtains information on at least one report destination to which the status detected by the status detector is to be reported in accordance with status report destination information in which the status of the image processing apparatus is associated with the information on the at least one report destination. The status reporting unit reports the status detected by the status detector to the at least one report destination on which the information is obtained by the status report destination information obtainer.

18 Claims, 14 Drawing Sheets

(56) References Cited

U.S. PATENT DOCUMENTS

2006/0095500 A1* 5/2006 Kato ............................ 709/201
2008/0061960 A1 3/2008 Tamura
2008/0228915 A1 9/2008 Tamura
2008/0278754 A1* 11/2008 Hibino ........................ 358/1.15

* cited by examiner

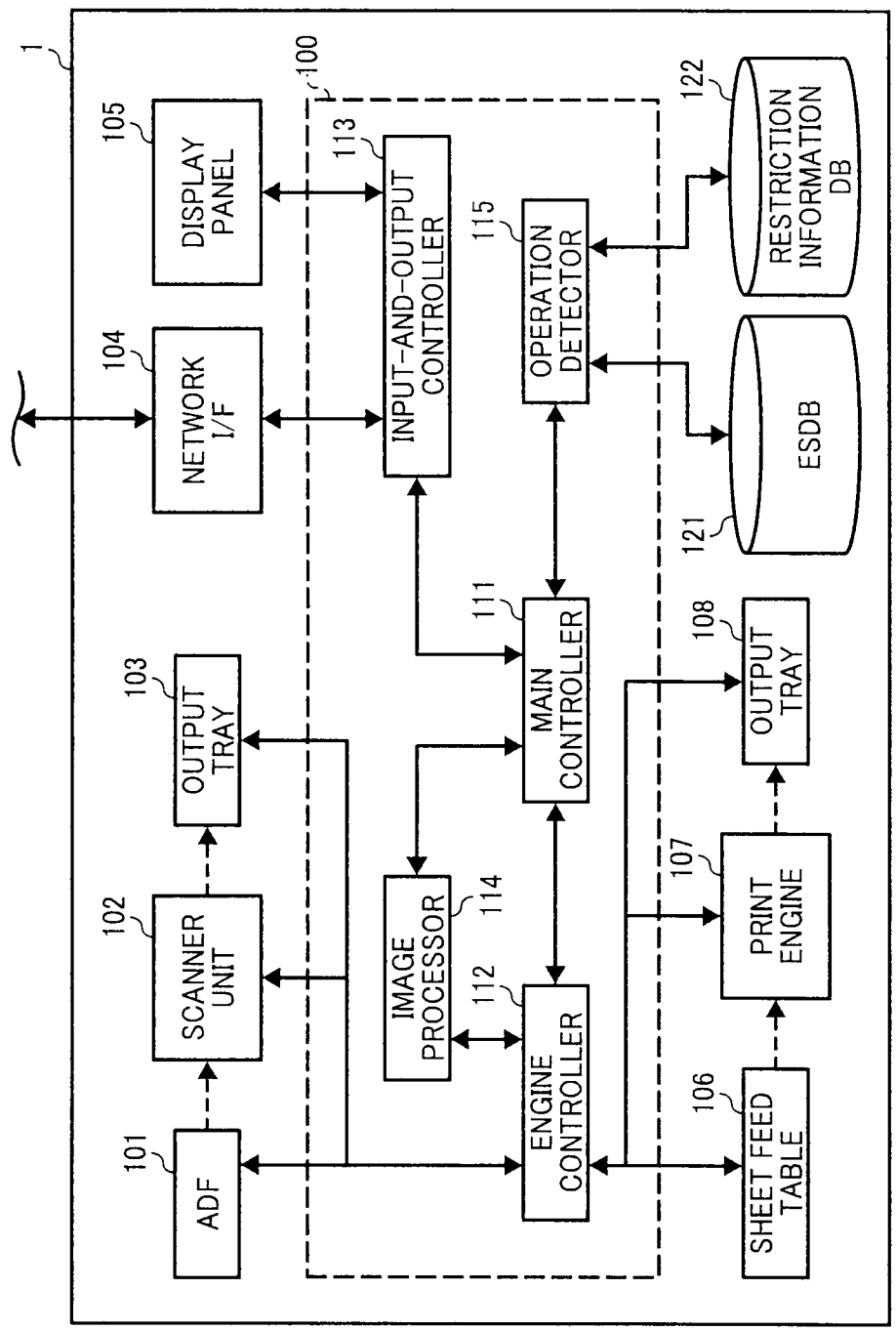

FIG. 4

| EVENT | | | | SUBSCRIBER |
|---|---|---|---|---|
| 1.1 OPERATION (JOB) | | | | admin1@example.com<br>log1@example.com |
| | 1.1.1 PRINTING | | | admin2@example.com<br>admin4@example.com |
| | | | 1.1.1.1 START | admin3@example.com |
| | | | 1.1.1.2 NUMBER OF PAGE | admin3@example.com<br>client1@example.com |
| | | | 1.1.1.2 NUMBER OF PRINTED PAGE | admin3@example.com<br>client1@example.com |
| | | | 1.1.1.2 PAUSE | admin3@example.com |
| | | | 1.1.1.3 END (COMPLETION) | admin3@example.com<br>client1@example.com |
| | 1.1.2 SCANNING | | | admin2@example.com |
| | | | 1.1.2.1 START | admin3@example.com |
| | | | 1.1.2.2 PAUSE | admin3@example.com |
| | | | 1.1.2.3 END (COMPLETION) | admin4@example.com<br>client2@example.com |
| 2.1 STATE (MAINTENANCE) | | | | admin1@example.com |
| | 2.1.1 SHEET | | | admin2@example.com |
| | | | 2.1.1.1 SHEET JAM | admin3@example.com |
| | | | 2.1.1.2 OUT OF SHEET | admin3@example.com |
| | | | 2.1.1.3 COUNTER | admin3@example.com |
| | | | 2.1.1.4 SIZE ERROR | admin3@example.com |
| | 2.2.2 NETWORK | | | admin2@example.com |
| | | | 2.2.2.1 ON-LINE | admin2@example.com |
| | | | 2.2.2.2 OFF-LINE | admin3@example.com |
| | | | 2.2.2.3 POWER OFF | admin3@example.com |
| | 2.2.3 ERROR | | | admin2@example.com |
| | | | 2.2.3.1 ERROR 0 | admin4@example.com |
| | | | 2.2.3.2 ERROR 1 | admin4@example.com |
| | | | 2.2.3.3 ERROR 2 | admin4@example.com |

FIG. 7A

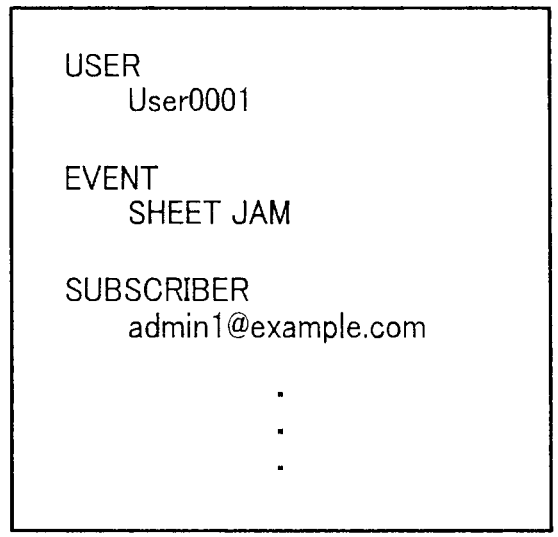

USER
 User0001

EVENT
 SHEET JAM

SUBSCRIBER
 admin1@example.com

< / job >

< jobid >00000001</jobid>
 < jobtitle >title1</jobtitle>
 < joburl >http://www.example.com/</joburl>
 < userid >user0001</userid>
 < groupid >group0001</groupid>
 < control method type=machine>
  < function > SHEET JAM </function>
  < function > OUT OF SHEET </function>
  < notify address >admin3@example.com</notify address>
 </control method >
 < control method type=machine >
  < control method >
  < function > COUNTER </function>
  < notify address >admin3@example.com</notify address>
 </control method >

< / job >

FIG. 7C

< / job >

< jobid >00000002</jobid>
    < jobtitle >title2</jobtitle>
    < joburl >http://www.example.com/2</joburl>
    < userid >user0001</userid>
    < groupid >group0001</groupid>
    < control method type=job>
        < function > NUMBER OF PAGE </function>
        < function > COMPLETION REPORT </function>
        < notify address >admin1@example.com</notify address>
    < /control method >
    < control method type=job >
        < function > NUMBER OF PRINTED PAGE </function>
        < notify address >admin2@example.com</notify address>
        < notify address >admin3@example.com</notify address>
    < /control method >

< / job >

FIG. 8

| USER ID | ENTRY AUTHORITY | |
|---------|-----------------|---|
| user0001 | accept | |
| user0001 | reject | ... |
| | ⋮ | |

FIG. 9

| EVENT | | | | ENTRY AUTHORITY |
|---|---|---|---|---|
| | 2.1 OPERATION (MAINTENANCE) | | | Reject : all<br>Accept : admin1@example.com<br>log@example.com |
| | | 2.1.1 SHEET | | Accept : admin2@example.com |
| | | | 2.1.1.1 SHEET JAM | (THE SAME AS THE ABOVE LEVEL) |
| | | | 2.1.1.2 OUT OF SHEET | (THE SAME AS THE ABOVE LEVEL) |
| | | | 2.1.1.3 COUNTER | (THE SAME AS THE ABOVE LEVEL) |
| | | | 2.1.1.4 SIZE ERROR | (THE SAME AS THE ABOVE LEVEL) |
| | | 2.2.2 NETWORK | | Accept : admin3@example.com |
| | | | 2.2.2.1 ON-LINE | (THE SAME AS THE ABOVE LEVEL) |
| | | | 2.2.2.2 OFF-LINE | (THE SAME AS THE ABOVE LEVEL) |
| | | | 2.2.2.3 POWER OFF | (THE SAME AS THE ABOVE LEVEL) |
| | | | ⋮ | |

FIG. 10

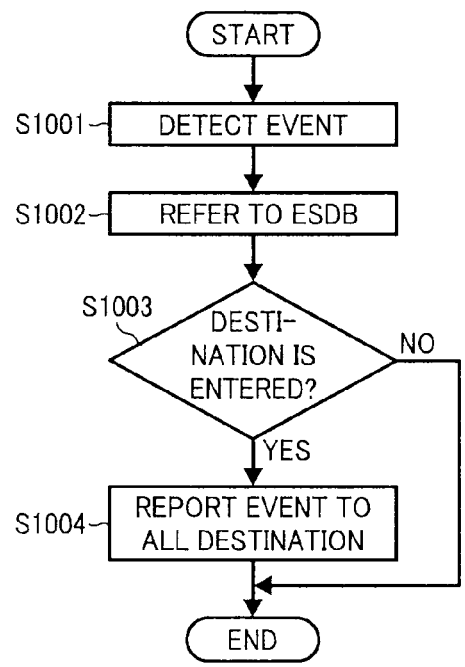

| DEVICE NAME | ID | IP ADDRESS | |
|---|---|---|---|
| CLIENT APPARATUS | client1@callserver.*** | 123.123.123.10 | |
| IMAGE PROCESSING APPARATUS | printer1@callserver.*** | 123.123.123.20 | ... |
| ADMINISTRATOR SERVER | admin1@callserver.*** | 123.123.123.30 | |
| LOG SERVER | log1@callserver.*** | 123.123.123.2 | |
| COMMUNICATION MANAGEMENT SERVER | callserver.*** | 123.123.123.2 | |
| ⋮ | | | |

FIG. 15B printer1@example.com

| EVENT | | | | SUBSCRIBER |
|---|---|---|---|---|
| | 1.1 OPERATION (JOB) | | | admin1@example.com<br>log1@example.com |
| | | 1.1.1 PRINTING | | admin2@example.com<br>admin4@example.com |
| | | | 1.1.1.1 START | admin3@example.com |
| | | | 1.1.1.2 NUMBER OF PAGE | admin3@example.com<br>client1@example.com |
| | | | 1.1.1.2 NUMBER OF PRINTED PAGE | admin3@example.com<br>client1@example.com |
| | | | 1.1.1.2 PAUSE | admin3@example.com |
| | | | 1.1.1.3 END (COMPLETION) | admin3@example.com<br>client1@example.com |
| | | 1.1.2 SCANNING | | admin2@example.com |
| | | | 1.1.2.1 START | admin3@example.com |
| | | | 1.1.2.2 PAUSE | admin3@example.com |
| | | | 1.1.2.3 END (COMPLETION) | admin4@example.com<br>client2@example.com |
| | 2.1 STATE (MAINTENANCE) | | | admin1@example.com |
| | | 2.1.1 SHEET | | admin2@example.com |
| | | | 2.1.1.1 SHEET JAM | admin3@example.com |
| | | | 2.1.1.2 OUT OF SHEET | admin3@example.com |
| | | | 2.1.1.3 COUNTER | admin3@example.com |
| | | | 2.1.1.4 SIZE ERROR | admin3@example.com |
| | | 2.2.2 NETWORK | | admin2@example.com |
| | | | 2.2.2.1 ON-LINE | admin2@example.com |
| | | | 2.2.2.2 OFF-LINE | admin3@example.com |
| | | | 2.2.2.3 POWER OFF | admin3@example.com |
| | | 2.2.3 ERROR | | admin2@example.com |
| | | | 2.2.3.1 ERROR 0 | admin4@example.com |
| | | | 2.2.3.2 ERROR 1 | admin4@example.com |
| | | | 2.2.3.3 ERROR 2 | admin4@example.com |

STATUS REPORTING APPARATUS, IMAGE PROCESSING SYSTEM, AND STORAGE MEDIUM STORING CONTROL PROGRAM

CROSS-REFERENCE TO RELATED APPLICATIONS

The present patent application claims priority pursuant to 35 U.S.C. §119 from Japanese Patent Application Nos. 2008-259686, filed on Oct. 6, 2008 and 2009-207354, filed on Sep. 8, 2009 in the Japan Patent Office, which are incorporated herein by reference in their entirety.

BACKGROUND OF THE INVENTION

1. Field of the Invention

Illustrative embodiments of the present invention relate to a status reporting apparatus, an image processing system, a control program, and a storage medium, and more specifically, to management of status information of an image processing apparatus.

2. Description of the Background

Recently, as information digitization has been increasingly promoted, image processing apparatuses such as printers, facsimiles, and scanners have come to be more widely used to output digitized information. Such image processing apparatuses include multi-functional apparatuses having several of image capturing, image forming, communication, and other capabilities.

Such image processing apparatuses may be connected to a network such as a LAN (local area network) and used, for example, as a network printer, which forms an image in accordance with a print job received from a client terminal such as a PC (personal computer) connected to the network.

One known method of managing such an image processing apparatus proposes monitoring the status of the image processing apparatus using a management server connected to the network. In the method, the management server monitors the status of the image processing apparatus at a certain time interval, detects events such as sheet jam, out of sheet, and print completion in the image processing apparatus, and reports the events to a predetermined destination.

To report the status of the image processing apparatus to an external device, one known method proposes reporting a change in status of the image processing apparatus to a predetermined destination. The image processing apparatus using the method reports the status change in processing executed in the image processing apparatus to the predetermined destination.

However, in the known methods of managing the image processing apparatus, the above-mentioned management server manages the image processing apparatus in accordance with predetermined system administrator information. Such a configuration prevents the administrator information from being dynamically changed to manage only desired information and only as needed. Further, those who want information on the status of the image processing apparatus are not limited only to the system administrator authorized to operate the management server. For example, a user requesting a job may want to receive information on the progress of the job, the occurrence of any error, and/or other events of the job. In such a case, the user may also need such job-related information in real time.

As described above, in the management of the image processing apparatus connected to the network, it may be insufficient to establish a single rule (management method) for every event. Instead, what is needed is a plurality of rules for each event.

SUMMARY OF THE INVENTION

In one illustrative embodiment, a status reporting apparatus for reporting a status of an image processing apparatus operating in connection with a network includes a status detector, a status report destination information obtainer, and a status reporting unit. The status detector detects a status of the image processing apparatus. The status report destination information obtainer obtains information on at least one report destination to which the status detected by the status detector is to be reported in accordance with status report destination information in which the status of the image processing apparatus is associated with the information on the at least one report destination. The status reporting unit reports the status detected by the status detector to the at least one report destination on which the information is obtained by the status report destination information obtainer.

In another illustrative embodiment, an image processing system includes an image processing apparatus operating in connection with a network and a status reporting apparatus to detect and report a status of the image processing apparatus. The status reporting apparatus includes an operation detector, an operation report destination information storage unit, an operation report destination information obtainer, and an operation report unit. The operation detector detects a status of an operation of the image processing apparatus. The operation report destination storage unit stores operation report destination information in which the operation of the image processing apparatus is associated with information on a report destination to which the status of the operation is to be reported. The operation report destination information obtainer obtains the information on the report destination to which the status of the operation of the image processing apparatus detected by the operation detector is to be reported in accordance with the operation report destination information. The operation report unit reports the status of the operation detected by the operation detector to the operation report destination on which the information is obtained by the operation report destination information obtainer.

In still another illustrative embodiment, an information-processing-apparatus readable storage medium stores program codes that cause an information processing apparatus operating in connection with a network to execute a method of controlling the information processing apparatus to operate as a status reporting apparatus that reports a status of an image processing apparatus operating in connection with the network to a report destination connected via the network. The information processing apparatus includes a status detector to detect the status of the image processing apparatus. The method includes detecting a status of the image processing apparatus with the status detector, obtaining information on a report destination to which a status detected by the status detector is to be reported in accordance with status report destination information in which the status of the image processing apparatus is associated with the information on the report destination, and reporting the status of the image processing apparatus detected by the detecting to the report destination obtained by the obtaining.

BRIEF DESCRIPTION OF THE DRAWINGS

A more complete appreciation of the disclosure and many of the attendant advantages thereof will be readily acquired as the same becomes better understood by reference to the following detailed description when considered in connection with the accompanying drawings, wherein:

FIG. 3 is a block diagram illustrating a functional configuration of an image processing apparatus according to an illustrative embodiment;

FIG. 4 is a diagram illustrating an example of ES information stored in an ESDB (event subscriber database);

FIG. 7A is a diagram illustrating an example of information contained in an entry request of ES information;

FIG. 7B is a diagram illustrating an example of information contained in an entry request message of ES information;

FIG. 7C is a diagram illustrating another example of information contained in an entry request message of ES information;

FIG. 8 is a diagram illustrating an example of user authority information;

FIG. 9 is a diagram illustrating an example of event authority information;

FIG. 10 is a flowchart illustrating an operation performed when an event on a state of the image processing apparatus is detected;

FIG. 15B is a diagram illustrating an example of ES information stored in an ESDB;

FIG. 17 is a flowchart illustrating an operation of the image processing apparatus performed when the power is turned on;

Figure 1:
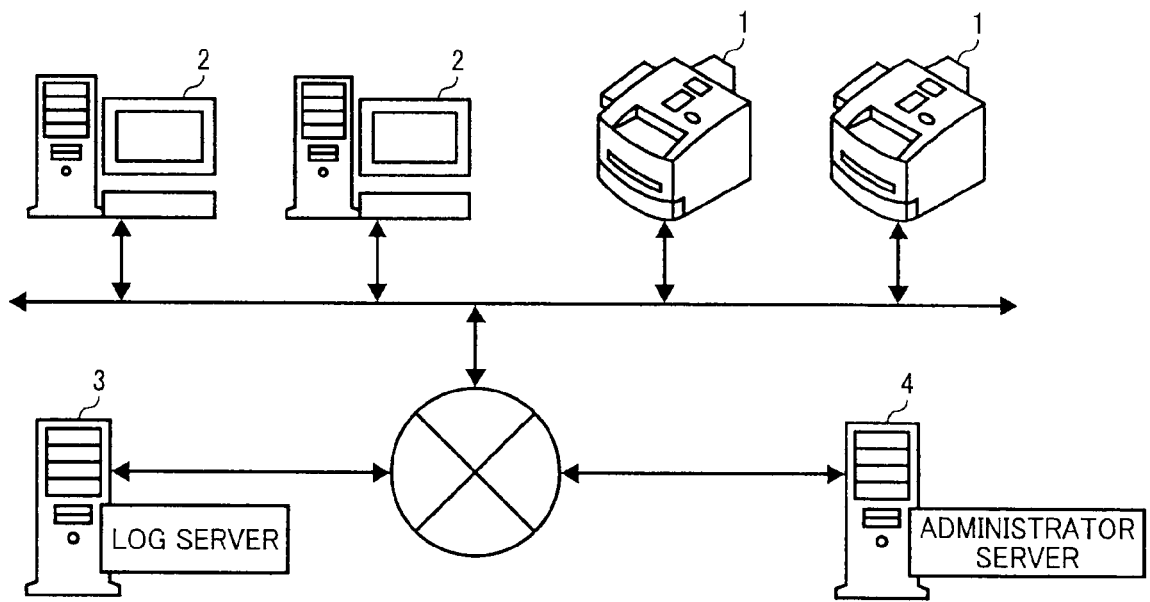
FIG. 1 is a schematic view illustrating a configuration of an image processing system according to an illustrative embodiment of the present disclosure.

The accompanying drawings are intended to depict illustrative embodiments of the present disclosure and should not be interpreted to limit the scope thereof. The accompanying drawings are not to be considered as drawn to scale unless explicitly noted.

DETAILED DESCRIPTION OF ILLUSTRATIVE EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the illustrative embodiments are described with technical limitations with reference to the attached drawings, such description is not intended to limit the scope of the present invention and all of the components or elements described in the illustrative embodiments of this disclosure are not necessarily indispensable to the present invention.

Below, illustrative embodiments according to the present disclosure are described with reference to attached drawings.

Illustrative Embodiment 1

FIG. 1 is a schematic view illustrating a configuration of an image processing system according to an illustrative embodiment of the present disclosure. As illustrated in FIG. 1, the image processing system includes, for example, an image processing apparatus 1, a client apparatus 2, a log server 3, and an administrator server 4 as information processing terminals. In FIG. 1, although two image processing apparatuses 1 and two client apparatuses 2 are connected, the number of each apparatus is not limited to two and may be any suitable number. In the image processing system, the image processing apparatus 1 detects a state or operation (hereinafter collectively referred to as "status") of itself as an event and reports the status to the log server 3 and the administrator server 4. Thus, the image processing apparatus 1 serves as a state reporting apparatus or an operation reporting apparatus (hereinafter collectively referred to as "status reporting apparatus").

The information processing terminals according to the present illustrative embodiment include the image processing apparatuses 1 in addition to the client apparatuses 2, the log server 3, and the administrator server 4 described above.

Figure 2:
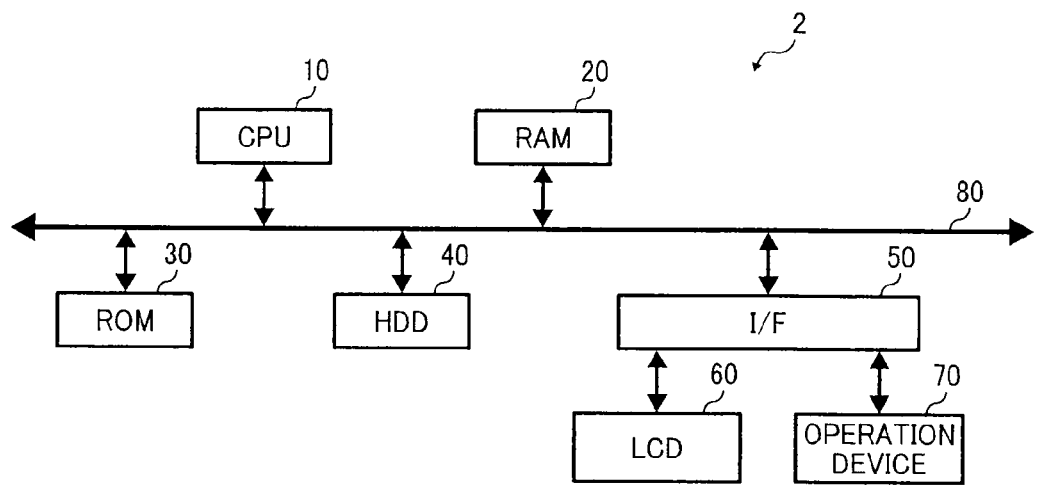
FIG. 2 is a schematic diagram illustrating a hardware configuration of an information processing terminal according to an illustrative embodiment.

FIG. 2 is a schematic diagram illustrating a hardware configuration of the client apparatus 2. Below, a description is given of the client apparatus 2. The configurations of the image processing apparatus 1, the log server 3, and the administrator server 4 are similar, if not the same, to the configuration of the client apparatus 2, and redundant descriptions thereof are omitted for simplicity.

As illustrated in FIG. 2, the client apparatus 2 has a CPU (central processing unit) 10, a RAM (random access memory) 20, a ROM (read only memory) 30, a HDD (hard disk drive) 40, and an I/F (interface) 50, which are connected via a bus 80. The I/F 50 is connected to an LCD (liquid crystal display) 60 and an operation device 70.

The CPU 10 is a computing device that entirely controls operation of the client apparatus 2. The RAM 20 is a volatile storage medium capable of reading and writing information at high speed and is used for a work area at which the CPU 10 processes data. The ROM 30 is a non-volatile storage medium to store programs such as firmware. The HDD 40 is a non-volatile storage medium capable of reading and writing information and stores an OS (operating system), various types of control programs, application programs, and so forth.

The I/F 50 connects the bus 80 to other hardware or network, allowing the CPU 10 to control them. The LCD 60 is a visual interface that allows a user to see the status of the client apparatus 2. The operation device 70 is a user interface such as a keyboard or a mouse that allows a user to input information to the client apparatus 2.

In such a hardware configuration, programs stored on the ROM 30, the HDD 40, and/or other optical media, not illustrated, are loaded on the RAM 20, and the CPU 10 performs control operation in accordance with such programs to form a software control unit. The software control unit is combined with hardware to form a functional block to achieve functions of the client apparatus 2. As described above, the log server 3 and the administrator server 4 have substantially the same configuration as the hardware configuration illustrated in FIG. 2 although user interfaces such as the LCD 60 and the operation device 70 may be omitted.

Next, a description is given of a functional configuration of the image processing apparatus 1. FIG. 3 is a block diagram illustrating the configuration of the image processing apparatus 1. As illustrated in FIG. 3, the image processing apparatus 1 includes, for example, a controller 100, an ADF (auto document feeder) 101, a scanner unit 102, a first output tray 103, a network I/F (interface) 104, a display panel 105, a sheet feed table 106, a print engine 107, a second output tray 108, an ESDB (event subscriber database) 121, and a restriction information DB 122.

As illustrated in FIG. 3, the image processing apparatus 1 is a multi-functional apparatus including the scanner unit 102 and the print engine 107. In FIG. 3, electric connection is indicated by a solid arrow, and the flow of a sheet or a bundle of sheets is indicated by a dotted arrow.

The controller 100 includes a main controller 111, an engine controller 112, an input-and-output controller 113, an image processor 114, and an operation detector 115. The controller 100 and the above-described components are configured by combining software and hardware. The operation detector 115 serving as a status detector detects a plurality of types of states, process stages, operations of the image processing apparatus 1 as events. The operation detector 115 refers to the ESDB 121 and obtains a network address of a destination apparatus to which the detected event is to be reported. Thus, the operation detector 115 serves as both the status detector and a report destination information obtainer. In addition, the operation detector 115 serves as a report destination updater and an update restriction unit as described below. The operation detector 115 is constituted by the CPU 10 controlling components in accordance with a program loaded on the RAM 20.

The network I/F 104 is an interface with which the image processing apparatus 1 communicates other devices via the network. The network I/F 104 may be, for example, an Ethernet (registered mark) interface or a USB (universal serial bus) interface. The network I/F 104 is constituted with the I/F 50 illustrated in FIG. 2.

The display panel 105 is an output interface that visually displays the status of the image processing apparatus 1 and an input interface (operation device) with which a user directly controls the image processing apparatus 1 or inputs information to the image processing apparatus 1. The display panel 105 is constituted with the LCD 60 and the operation device 70 illustrated in FIG. 2.

The ESDB 121 is a storage unit that stores, as status report destination information, an event arising in the image processing apparatus 1 in association with a network address of a subscriber that receives a report when the event arises. The network address may be, for example, an IP (internet protocol) address, an URI (uniform resource indicator), or any other suitable identifier. For example, the URI is described as follows: sip:0123456789@example.com or im:0123456789@example.com. The URI is associated with an IP address according to a protocol such as DNS (domain name system) protocol or SIP (session initiation protocol) and entered in, e.g., an administration server 4. In such a case, the report destination may be identified by executing a redirect via the administration server 4. Alternatively, when XMPP (extensible messaging and presence protocol) is employed, the administration server 4 may associate a session request from the client apparatus 2 with the URI, allowing identifying the client apparatus 2 using an IP address of the session request.

The image processing apparatus 1 reports an event to an external device in accordance with such information stored in the ESDB 121.

Here, an example of the information (hereinafter "ES information") stored in the ESDB 121 is described with reference to FIG. 4. As illustrated in FIG. 4, an event is stored in the ESDB 121 in association with a subscriber that receives a report on the event. FIG. 4 shows that, for example, when a sheet jam occurs in the image processing apparatus 1, the image processing apparatus 1 reports the event to admin1@example.com, admin2@example.com, and admin3@example.com. Thus, the ESDB 121 may contain one event in association with a plurality of report destinations, allowing the image processing apparatus 1 to report the event to the plurality of devices.

As illustrated in FIG. 4, the event arising in the image processing apparatus 1 may be, for example, an operation of the image processing apparatus 1 such as print start or end or a state of the image processing apparatus 1 such as a sheet jam or out of sheet. In other words, the event is information on the operation (operation event) or state (state information) of the image processing apparatus 1. Therefore, the ES information is status-report-destination information in which a status of the image processing apparatus 1 is associated with information on a report destination(s) to which the status is reported. The ESDB 121 also serves as a report-destination-information storage unit.

Figure 5:
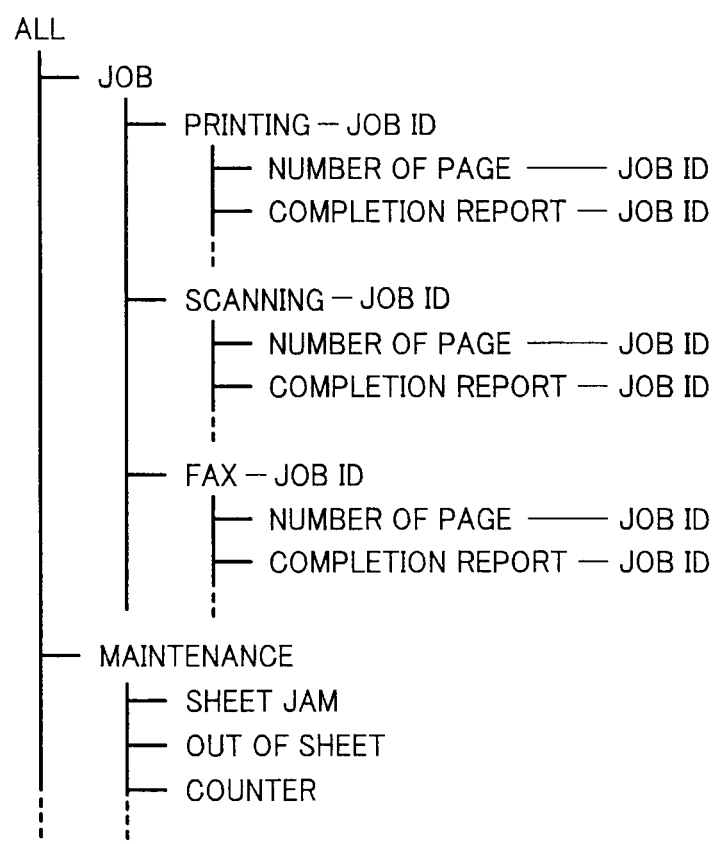
FIG. 5 is a conceptual diagram illustrating an example of a hierarchical structure of events.

Events arising in the image processing apparatus 1 are organized into a hierarchy of categories by concept level. FIG. 5 conceptually shows an example of the hierarchy of categories of events. As illustrated in FIG. 5, the event of the image processing apparatus 1 has, for example, two categories "job" and "maintenance". The "job" category includes particular jobs such as "printing", "scanning", and "FAX" at a lower concept level. Further, each job includes particular events such as "number of page", "completion report" at a still lower concept level. The particular jobs and events are also classified by job ID at a further still lower concept level. Information of the hierarchy of categories illustrated in FIG. 5 is held in the operation detector 115.

Creating the hierarchy of categories of events as illustrated in FIG. 5 allows reporting all events listed under a particular category. Since the "job" category is set to the event in the example illustrated in FIG. 4, all events listed under the "job" category in FIG. 5 are reported to "admin1@example.com" and "log1@example.com". All events listed under the category "maintenance" are reported to "admin1@example.com". Such a configuration obviates the necessity of setting all events separately, allowing saving the volume of the ESDB 121. Such effect is obtained by using the information on the hierarchy of categories as illustrated in FIG. 5 held in the operation detector 115.

In the present illustrative embodiment, the operation detector 115 of the image processing apparatus 1 enters ES information in the ESDB 121 in accordance with the operation of the client apparatus 2 or the administrator server 4 performed by a user or administrator. At this time, by referring to the restriction information DB 122, the operation detector 115 determines whether or not the user or administrator is authorized to update the status report destination information stored in the restriction information DB 122. The restriction information DB 122 is a storage unit to store information (hereinafter "update authority information") on the authority for updating the report-destination information stored in the ESDB 121. The update authority information on the authority for updating the report-destination information stored in the ESDB 121 or the restriction information DB 122 includes, for example, user authority information (see FIG. 8), event authority information (see FIG. 9), and other information.

The controller 100 is constituted by combination of software and hardware. Specifically, programs such as firmware stored on a non-volatile memory such as the ROM 30 and/or a non-volatile recording media such as the HDD 30 or another type of optical disc are loaded on the RAM 20, which is a volatile memory such as DRAM (dynamic random access memory). The software control unit implemented by the CPU 10 controlling relevant components in accordance with the a program is combined with hardware such as an integrated circuit to constitute the controller 100. The controller 100 serves as a control unit that entirely controls the image processing apparatus 1.

The main controller 111 controls and instructs components of the controller 100. The engine controller 112 serves as a driver that controls driving of the print engine 107 and the scanner unit 102. The input-and-output controller 113 inputs signals and instructions received via the network I/F 104 to the main controller 111 and accesses other devices via the network I/F 104 in accordance with the control of the main controller 111. The input-and-output controller 113 also displays information on the display panel 104 and reports information inputted via the display panel 105 to the main controller 111.

In accordance with the control of the main controller 111, the image processor 114 creates drawing information based on image information to be printed and output. The drawing information is information with which the print engine 106 draws an image during image formation. The image processor 114 processes scanned image data inputted from the scanner unit 102 to create image data. As a product of the scanning, the image data is stored in the image processing apparatus 1 or transmitted to the client apparatus 2 via the network I/F 104.

The operation detector 115 detects the status of the image processing apparatus 1 as an event in accordance with the control of the main controller 111. Detecting an event, the operation detector 115 refers to the ESDB 121 to obtain a network address of a device to which the detected event is reported. As described above, the operation detector 115 is implemented by the CPU 10 controlling components in accordance with the program loaded on the RAM 20 illustrated in FIG. 2.

During printing, scanning, and copying, the image processing apparatus 1 selectively reports a change in status of the image processing apparatus 1 to a predetermined destination(s). When the image processing apparatus 1 performs printing in response to a print request from an external device, the input-and-output controller 113 receives a print job via the network I/F 104 and transfers the print job to the main controller 111. Receiving the print job, the main controller 111 controls the image processor 114 to create drawing information in accordance with document information or image information contained in the print job. When the drawing information is created by the image processor 114, the engine controller 112 forms an image on a recording sheet transported from the sheet feed table 106 in accordance with the created drawing information. The print engine 107 may employ, for example, an inkjet-type image forming mechanism or an electrophotographic-type image forming mechanism. The sheet on which the image has been formed with the print engine 107 is output to the second output tray 108.

When the image processing apparatus 1 performs scanning, the input-and-output controller 113 transfers a scanning execution signal to the main controller 111 in accordance with a scanning execution instruction inputted from the display panel 105 by a user or an external device such as the client apparatus 2 via the network I/F 104. The main controller 111 controls the engine controller 112 in accordance with the scanning execution signal received.

The engine controller 112 drives the ADF 101 and feeds a target document placed on the ADF 101 to the scanner unit 102. The engine controller 112 drives the scanner unit 102 to capture an image of the document fed from the ADF 101. Alternatively, when the target document is directly placed on the scanner unit 102 instead of the ADF 101, the scanner unit 102 captures an image of the document in accordance with the control of the engine controller 112. Thus, the scanner unit 102 operates as an image capturing device.

During the image capturing, an imaging device such as a CCD (charge coupled device) in the scanner unit 102 optically scans the document to create captured image information based on the optically scanned information. The engine controller 112 transfers the captured image information to the image processor 114. In accordance with the control of the main controller 111, the image processor 114 creates image information based on the captured image information received from the engine controller 112.

The image information created by the image processor 114 is stored on a storage medium such as the HDD 40 mounted on the image processing apparatus 1. In this regard, the image information is stored on the HDD 40 or another storage medium or transmitted to an external device via the network I/F 104 in accordance with an instruction from a user.

When the image processing apparatus 1 performs copying, the image processor 114 creates drawing information based on either the scanned image information which the engine controller 112 receives from the scanner unit 102 or the image information created by the image processor 114. As with the printing operation, the engine controller 112 drives the print engine 107 in accordance with the drawing information.

Next, a description is given of a status report of the image processing apparatus 1. In the present illustrative embodiment, a user or administrator operates the client apparatus 2 or the administrator server 4 to transmit a data-entry request to the image processing apparatus 1 and enters ES information in the ESDB 121 of the image processing apparatus 1. FIG. 7A shows an example of information contained in the entry request. In FIG. 7A, the entry request of ES information contains information on user, event, subscriber. For example, the client apparatus 2 creates an entry request of ES information as illustrated in FIG. 7A and transmits a message (hereinafter "entry request message") as illustrated in FIGS. 7B and 7C in accordance with the created entry request.

The examples of the entry request message illustrated in FIGS. 7B and 7C are described in a structured format such as XML (extensible markup language). Alternatively, the entry request message may be described in a similar format such as JSON (JavaScript object notation), YAML (YAML ain't markup language), and RDF (resource description framework). Further, the entry request message may be described in a non-structured format such as text format.

Figure 6B:
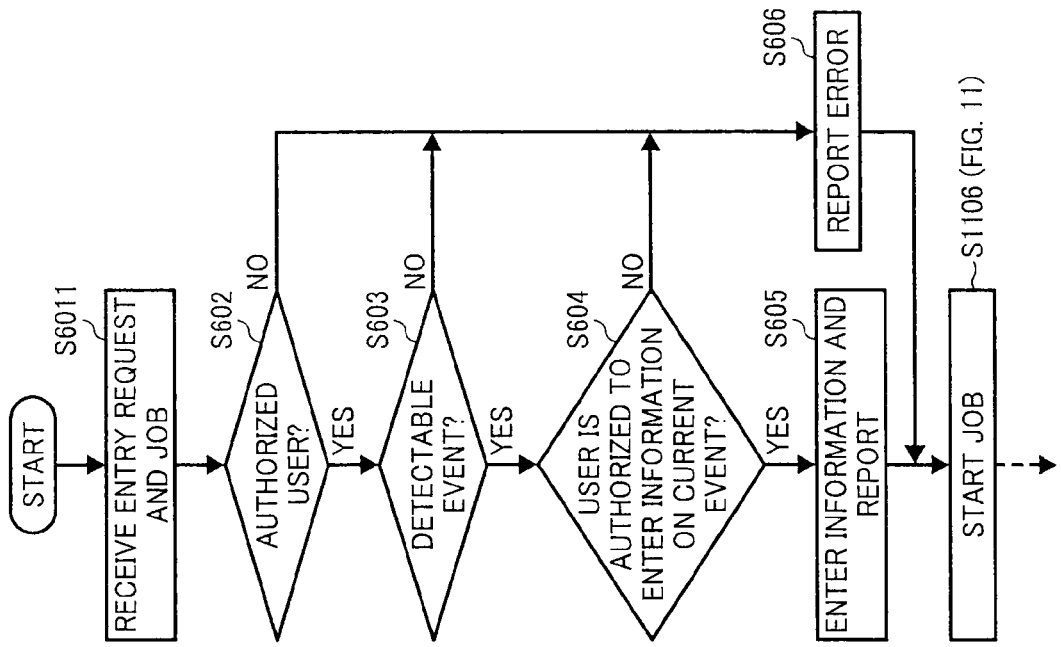
FIG. 6B is a flowchart illustrating another example of operation performed when ES information is entered in the ESDB.
Figure 6A:
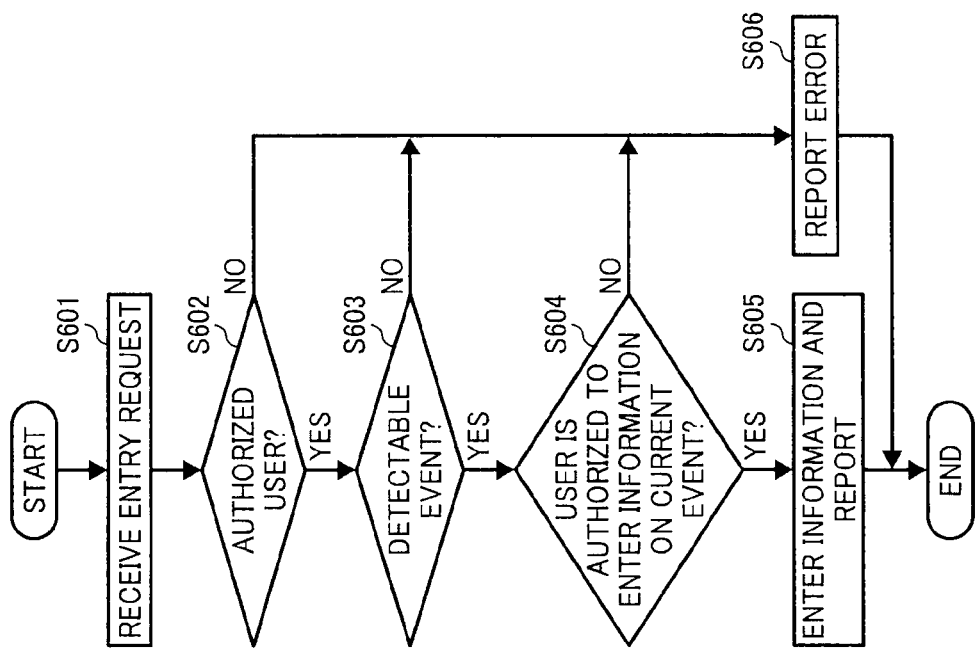
FIG. 6A is a flowchart illustrating an example of operation performed when ES information is entered in the ESDB.

Next, the operation performed when ES information is entered in the ESDB 121 of the image processing apparatus 1 is described with reference to FIG. 6A. FIGS. 6A and 6B are flowcharts illustrating examples of the operation performed when ES information is entered in the ESDB 121. FIG. 6A illustrates an entry operation responding to an entry request for the state of the image processing apparatus 1. FIG. 6B illustrates an entry operation responding to an entry request for the operation of the image processing apparatus 1.

In the image processing apparatus 1, at S601 the input-and-output controller 113 receives a message including an entry request of ES information via the network I/F 104.

In the example of the message illustrated in FIG. 7A, the user information includes a user ID of a user sending an entry request of ES information. Event information includes information identifying an event to be detected in the image processing apparatus 1 and corresponds to the event defined in the ES information illustrated in FIG. 4. Subscriber information includes information on a network address of a destination device to which a detected event is reported and corresponds to the subscriber of ES information illustrated in FIG. 4.

Receiving the entry request message of ES information illustrated in FIG. 7A, the input-and-output controller 113 inputs the ES information to the main controller 111. The main controller 111 inputs the ES information to the operation detector 115 and controls the operation detector 115 to execute entry processing of the ES information.

Receiving the ES information, at S602 the operation detector 115 determines whether the user requesting the entry of ES information is an authorized user in accordance with the control of the main controller 111. At this time, the operation detector 115 refers to the restriction information DB 122 to determine the authority of the user. FIG. 8 shows an example of information (hereinafter "user authority information") to which the operation detector 115 refers at S602 from among update authority information stored in the restriction information DB 122.

As illustrated in FIG. 8, the user authority information is information in which the user ID of a user is associated with information indicating whether the user has an authority to enter ES information. For example, in FIG. 8, "user0001" is associated with "accept". This shows that the user of the ID "user0001" has the authority to enter ES information. At S602, the operation detector 115 refers to the restriction information DB 122 using the user information (the user ID of the user requesting the entry) from among the information contained in the entry request message to obtain information on "entry authority". Based on the content "accept" or "reject" of the information on the entry authority, the operation detector 115 determines whether or not the user requesting the entry is an authorized user.

If the entry request is received from an unauthorized user ("NO" at S602), the operation detector 115 inputs to the main controller 111 a request error that the entry is not allowed. At S606 the main controller 111 controls the input-and-output controller 113 to report the request error to the sender of the entry request, and the process ends. Such a configuration allows determining the update authority of ES information for respective users.

On the contrast, if the entry request is received from an authorized user ("YES" at S602), at S603 the operation detector 115 determines whether or not the event on which the entry of ES information is requested is a detectable event. At this time, the operation detector 115 determines whether or not the event designated in the entry request message is detectable. For example, if the operation detector 115 cannot detect "out of sheet" state when ES information on "out of sheet" is entered, the operation detector 115 could not report the state, wasting the entry. Hence, at S603 the operation detector 115 determines whether or not the operation detector 115 can detect the event designated in the entry request message.

If the event designated in the entry request message is not detectable ("NO" at S603), at S606 the main controller 111 controls the input-and-output controller 113 to report the request error to the sender of the entry request, and the process ends. Such a configuration allows preventing the entry of unused ES information. By contrast, if the event designated in the entry request message is detectable ("YES" at S603), at S604 the operation detector 115 determines whether or not the user requesting the entry has an authority to enter ES information on the designated event.

As with S602, at S604 the operation detector 115 refers to the restriction information DB 122 to determine the authority of the user requesting the entry in accordance with information (hereinafter "event authority information") on the authority of the user for respective events. FIG. 9 shows an example of the event authority information to which the operation detector 115 refers at S604 from among information stored in the restriction information DB 122.

As illustrated in FIG. 6, the event authority information is information in which the network address of a user is associated with an event(s) and the information on whether the user has the authority to enter ES information on the event(s). The event authority information is hierarchically structured as with FIG. 5, and when the entry authority is designated at a higher-level category such as "job" and "event", the same entry authority is set to lower categories such as particular events under the higher category.

As the result of the determination at S604, when the user is not authorized ("NO" at S604), the operation detector 115 reports the request error and the process ends. Such a configuration allows determining the update authority of ES information on respective events. By contrast, as the result of the determination at S604, if the user is authorized ("YES" at S604), the operation detector 115 enters an event and subscriber designated in the received entry request to the ESDB 121 and inputs to the main controller 111 a completion report that the entry has been completed. At S605 the main controller 111 controls the input-and-output controller 113 to transmit the completion report to the sender of the entry request, and the process ends. Thus, the operation detector 115 serves as a report destination information updater.

Through the above-described processing, the entry of ES information to the ESDB 121 is completed. In the present illustrative embodiment, executing the processing of S602, S603, and S604 illustrated in FIG. 6 allows preventing an unauthorized user from entering and altering ES information. Thus, the operation detector 115 and the restriction information DB 122 serve as the update restriction unit. In the above description, the case in which respective terminal devices separately enter ES information is described. Alternatively, when a plurality of client apparatuses 2 (or users) are grouped under a group ID, ES information may be collectively set to the restriction information DB 122 using the group ID. Hence, the image processing apparatus 1 may store an association table in which the group ID is associated with user IDs of the users having the group ID. By referring to the association table, the acceptance and rejection of the entry request of ES information may be determined.

Next, the operation performed when the operation detector 115 detects an event regarding the state of the image processing apparatus 1 is described as an example of the operation of the image processing apparatus 1. FIG. 10 is a flowchart illustrating the operation performed when the operation detector 115 detects an event regarding the state of the image processing apparatus 1.

At S1001 the operation detector 115 detect an event. Thus, the operation detector 115 serves as a status detector.

At S1002 the operation detector 115 refers to the ESDB 121 in accordance with the detected event, and obtains a network address of a subscriber to which the detected event is to be reported. Thus, the operation detector 115 serves as a report destination information obtainer.

If no subscriber is entered in the ESDB 121 as the report destination of the event detected ("NO" at S1003), the operation detector 115 finishes the process. On the contrary, if a subscriber(s) is (are) entered in the ESDB 121 as the report destination of the detected event ("YES" at S1003), the operation detector 115 obtains information on the subscriber and reports the information to the main controller 111.

Receiving the subscriber information from the operation detector 115, at S1004 the main controller 111 controls the input-and-output controller 113 to report the occurrence of the event to the subscriber, and finishes the process. Thus, the input-and-output controller 113 serves as a status reporting unit. Thus, the image processing apparatus 1 completes reporting the detected event to other devices. For example, if the event detected at S1001 is "sheet jam", the subscriber associated with the event in FIG. 4 is "admin3@example.com" for the "sheet jam" category, "admin2@example.com" for the "sheet" category, and "admin1@example.com" for the "maintenance" category. Accordingly, the input-and-output controller 113 reports the occurrence of "sheet jam" to "admin3@example.com", "admin2@example.com", and "admin1@example.com".

Thus, the entry of ES information in the ESDB 121 allows the image processing apparatus 1 to report the occurrence of an event to a certain destination(s) in accordance with the type of the event. Such a configuration allows external devices connected to the image processing apparatus 1 via the network to receive only a report on a certain event. Thus, the image processing apparatus can provide easy status monitoring and enhanced convenience.

Next, a description is given of the operation performed when an event on job execution of the image processing apparatus 1 is detected.

When a user operates the client apparatus 2 to execute printing in the image processing apparatus 1, the status such as the page number being output or print completion of a job executed in the image processing apparatus 1 is reported the client apparatus 2, providing enhanced convenience to the user. Here, as one example, a description is given of the case in which a print job is inputted from the client apparatus 2. In the image processing apparatus 1 according to the present illustrative embodiment, ES information is entered in the ESDB 121 in response to the received print job, allowing reporting the job status to the user.

Figure 11:
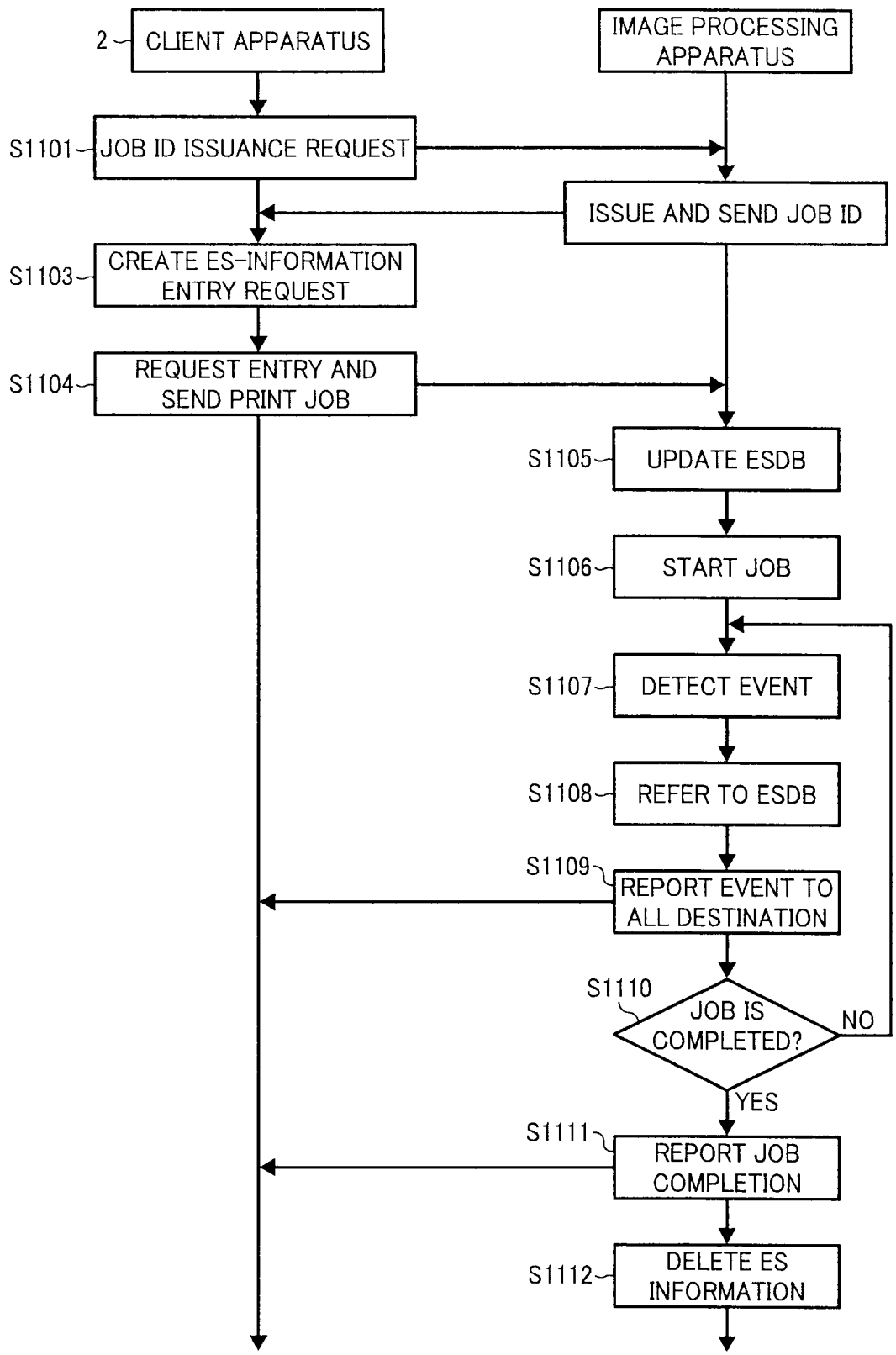
FIG. 11 is a sequence diagram illustrating an operation performed when the image processing apparatus receives a print job and executes printing.

FIG. 11 is a sequence diagram illustrating an operation performed when the image processing apparatus 1 receives a print job from the client apparatus 2 to execute printing.

When sending a print job to the image processing apparatus 1, at S1101 the client apparatus 2 (e.g., "client1@example.com") sends an issuance request of a job ID of the print job in advance. In the image processing apparatus 1, the input-and-output controller 113 receives the job-ID issuance request via the network I/F 104 and inputs the job-ID issuance request to the main controller 111.

Receiving the job-ID issuance request, at S1102 the main controller 111 controls the engine controller 112 to issue the job ID. When the job ID is issued with the engine controller 112, the main controller 111 controls the input-and-output controller 113 to transmit the job ID to the client apparatus 2.

Figure 12:
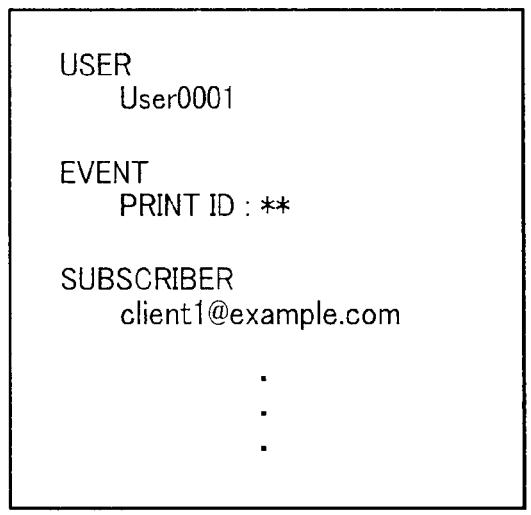
FIG. 12 is a diagram illustrating another example of information contained in an entry request of ES information.

Receiving the job ID from the image processing apparatus 1, at S1103 the client apparatus 2 creates an entry request of ES information as illustrated in FIG. 12 using the received job ID. At this time, the client apparatus 2 creates the entry request to receive the report on the designated event sent in response to execution of the print job. In other words, the "printing" category and the job ID received at S1102 are designated in the entry request. Thus, out of the particular events listed under the "printing" category, only events on the print job to be sent from the client apparatus 2 at S1103 are designated as the events to be reported. Creating the entry request of ES information as illustrated in FIG. 12, the client apparatus 2 sends an entry request message (similar to the message illustrated in FIGS. 7B and 7C) based on the created entry request and the print job to the image processing apparatus 1. Thus, the client apparatus 2 serves as an execution instruction sender and a report-destination-information storage and instruction unit.

In the image processing apparatus 1, the input-and-output controller 113 receives the entry request message and the print job via the network I/F 104, which corresponds to S6011 illustrated in FIG. 6B. The input-and-output controller 113 inputs the received information to the main controller 111. The main controller 111 inputs the entry request of ES information from among the received information to the operation detector 115.

Receiving the entry request of ES information, the operation detector 115 executes the processing of S602 to S605 illustrated in FIG. 6B and at S1105 updates the ESDB 121 in accordance with the entry request. Thus, information of the ESDB 121 is updated so that particular events of the "printing" category having the designated job ID are reported to "client1@example.com" (the client apparatus 2).

When the ESDB 121 is updated, at S1106 the main controller 111 controls the engine controller 112 and the image processor 114 to executed the print job. While the image processing apparatus 1 executes the print job, at S1107 the operation detector 115 sequentially detects events.

Detecting a particular event, at S1108 the operation detector 115 refers to the ESDB 121 and obtains information on the subscriber to which the detected event is reported. At this time, when the event is associated with a plurality of subscribers, the operation detector 115 obtains information on the plurality of subscribers. Through the processing of S1105, the client apparatus 2, which is the sender of the print job, is entered in the ESDB 121 as the subscriber to which the event of the job executed at S1106 is to be reported. Accordingly, at S1108, information on the client apparatus 2 is obtained as the subscriber to which the detected event is reported.

When the operation detector 115 obtains a network address of the client apparatus 2 as the subscriber information, as with S1004 illustrated in FIG. 10, at S1109 the input-and-output controller 113 controlled by the main controller 111 reports the occurrence of the event to the client apparatus 2. If information on other subscriber(s) is obtained by the processing at S1108, the occurrence of the event is reported to the apparatus corresponding to the information on other subscriber(s). If the print job is not completed ("NO" at S1110), the processing of S1107 to S1109 is repeated multiple times according to the progress of the print job until the print job is completed.

For example, when the print job is completed ("YES" at S1110), at S1111 the operation detector 115 sends to the client apparatus 2 and other subscriber apparatuses the report that the print job has been completed.

At S1112, the operation detector 115 deletes the ES information entered at S1105 and finishes the process. The above-described processing allows reporting necessary information to respective users during execution of the print job. Further, the processing of deleting the ES information at S1112 allows effective use of the volume of the ESDB 121, resulting in size saving.

Further, the processing of S1107 to S1109 allows reporting in real time the events on the print job.

With the above-described configuration, the image processing apparatus 1 according to the present illustrative embodiment reports in real time only necessary event information on the status of the image processing apparatus 1 to a plurality of users having different information needs, providing easy status monitoring and enhanced convenience to users.

In the above-described illustrative embodiment, the ESDB 121 is provided within the image processing apparatus 1. Such a configuration allows quick acquisition of the ES information by retrieving the ESDB 121. Alternatively, the ESDB 121 may be provided in an external device connected to the image processing apparatus 1 via the network. Such a configuration allows the image processing apparatus 1 to execute substantially the same processing as described above by obtaining ES information via the network. In such a case, the image processing apparatus 1 may also transmit information on a detected event to the ESDB 121 via the network to obtain only information on a subscriber(s) associated with the detected event.

Illustrative Embodiment 2

The above-described illustrative embodiment 1 is described under the assumption that a plurality of devices connected through the network directly communicates with each other. In the present illustrative embodiment 2, a configuration example is described in which the plurality of devices connected through the network communicate through the intermediation of a communication management server 5 according to SIP (session initiation protocol), XMPP (extensible messaging and presence protocol), or any other suitable protocol. Further, the following description assumes that ES information is managed with the communication management server 5.

One reason that ES information is managed with the communication management server 5 is to allow easier setting of a log management server or an administrator. For example, a configuration in which logs are stored in the image processing apparatus 1 may need additional software in the image processing apparatus 1, access to data in the image processing apparatus 1 to analyze the logs, more space to backup data in the image processing apparatus 1.

Hence, in the present illustrative embodiment, the communication management server 5 relatively freely sets a log management module (so-called "logger") and separately sets different loggers for respective devices in a relatively simple manner.

Such a configuration allows dynamically setting and switching the logger in response to the type of event during operation, and simply executing updating of the logger software such as the change of log format. Further, the setting on the event report to the administrator can be dynamically performed.

Figure 13:
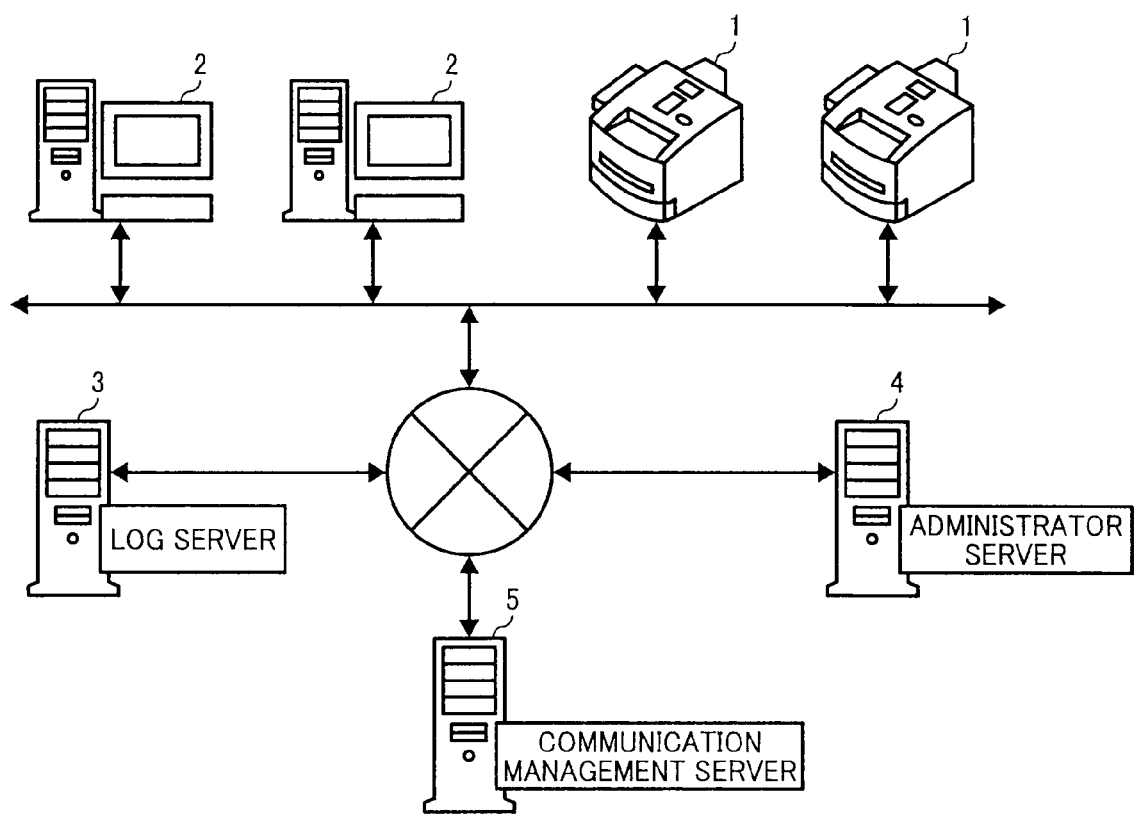
FIG. 13 is a schematic view illustrating a configuration of an image processing system according to another illustrative embodiment.

FIG. 13 shows a configuration of an image processing system according to the present illustrative embodiment. Below, the same reference numerals are allocated to components similar to those shown in the above-described illustrative embodiment 1, and descriptions thereof are omitted for simplicity.

In FIG. 13, the image processing system includes the communication management server 5 in addition to the components of the illustrative embodiment 1. The communication management server 5 manages communication between devices illustrated in FIG. 13 according to a certain protocol. Below, a description is given of an example in which the communication management server 5 manages communication according to SIP. Such a configuration allows achieving relatively secure communication. The image processing apparatus 1 has substantially the same hardware configuration as the configuration illustrated in FIG. 2. It is to be noted that as with the log server 3 and the administrator server 4, the LCD 60 and the operation device 70 may be omitted from the communication management server 5.

Next, a functional configuration of the communication management server 5 serving as a communication management apparatus is described with reference to FIG. 14.

Figures 14, 15A:
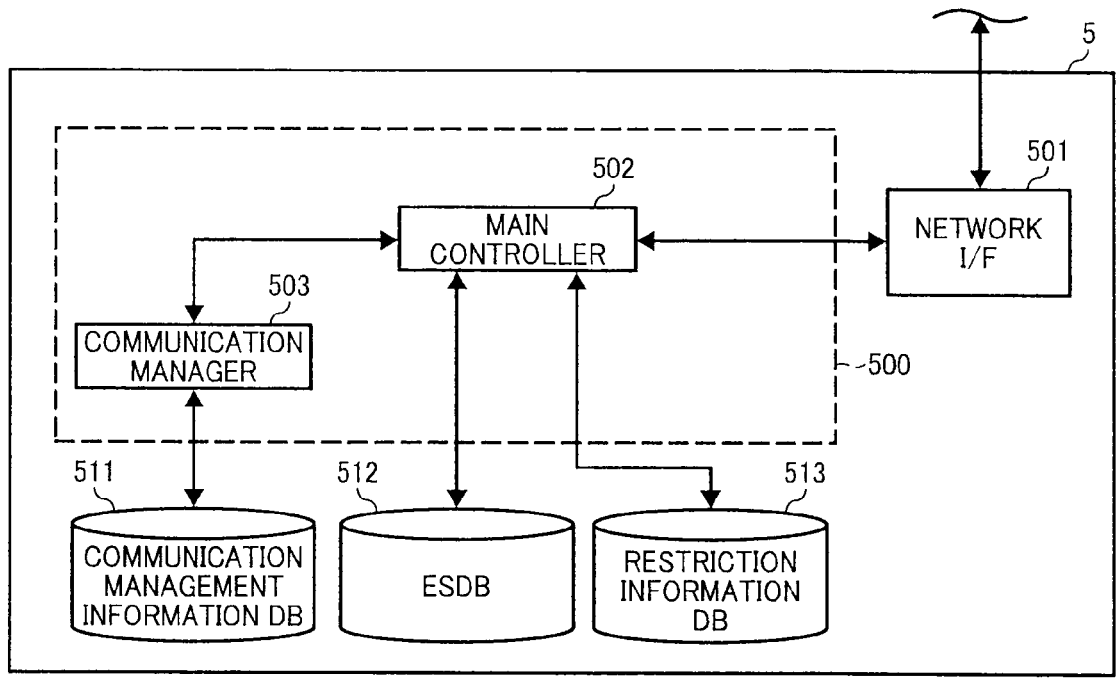
FIG. 14 is a block diagram illustrating a functional configuration of a communication management server.
FIG. 15A is a diagram illustrating an example of information stored in a communication management information DB.

As illustrated in FIG. 14, the communication management server 5 includes a controller 500, a network I/F 501, a communication management information DB 511, an ESDB 512, and a restriction information DB 513. The controller 500 includes a main controller 502 and a communication manager 503 and entirely controls the communication management server 5. The main controller 502 controls components of the controller 500. The communication manager 503 performs communication management illustrated in FIG. 16 while referring to the communication management information DB 511. The controller 500 is constituted by the CPU 10 controlling components in accordance with a program loaded on the RAM 20.

The network I/F 501 is an interface with which the communication management server 5 communicates other devices via the network. The network I/F 501 is constituted with I/F 50 illustrated in FIG. 2.

The communication management information DB 511 is a storage unit in which the communication management server 5 stores information to manage communication with other devices. FIG. 15A shows an example of the information stored in the communication management information DB 511. As illustrated in FIG. 15A, the communication management information DB 511 stores the name of a device subjected to communication management in association with both a distinction ID (network address) of the device on the network, and an IP address of the device. The distinction ID of the target device on the network is an ID with which the communication management server 5 manages the communication with other devices.

The communication management information DB 511 stores information of a device being in operation in connection with the network. Accordingly, even if a plurality of devices is connected to the network as illustrated in FIG. 13, information on a device which is powered off is not stored on the communication management information DB 511.

In other words, when information on the powered-off device is entered in the communication management information DB 511 and the device is powered on, the device logs in the communication management server 5. Thus, information on the powered-on device is entered in the communication management information DB 511, allowing communication via the network. For example, in the image processing apparatus 1, the above-described login is executed with the input-and-output controller 113 in accordance with the control of the main controller 111. Thus, the input-and-output controller 113 serves as a communication start unit.

The ESDB 512 is a storage unit that stores initial data of ES information illustrated in FIG. 4. For example, the ESDB 512 of the communication management server 5 stores initial data of ES information on a plurality of image processing apparatuses connected via the network (see FIG. 15B).

The restriction information DB 513 is a storage unit that stores restriction information described with reference to FIGS. 8 and 9. As with the ESDB 512, the restriction information DB 513 stores restriction information on a plurality of image processing apparatuses connected via the network, which is described later.

Figure 16:
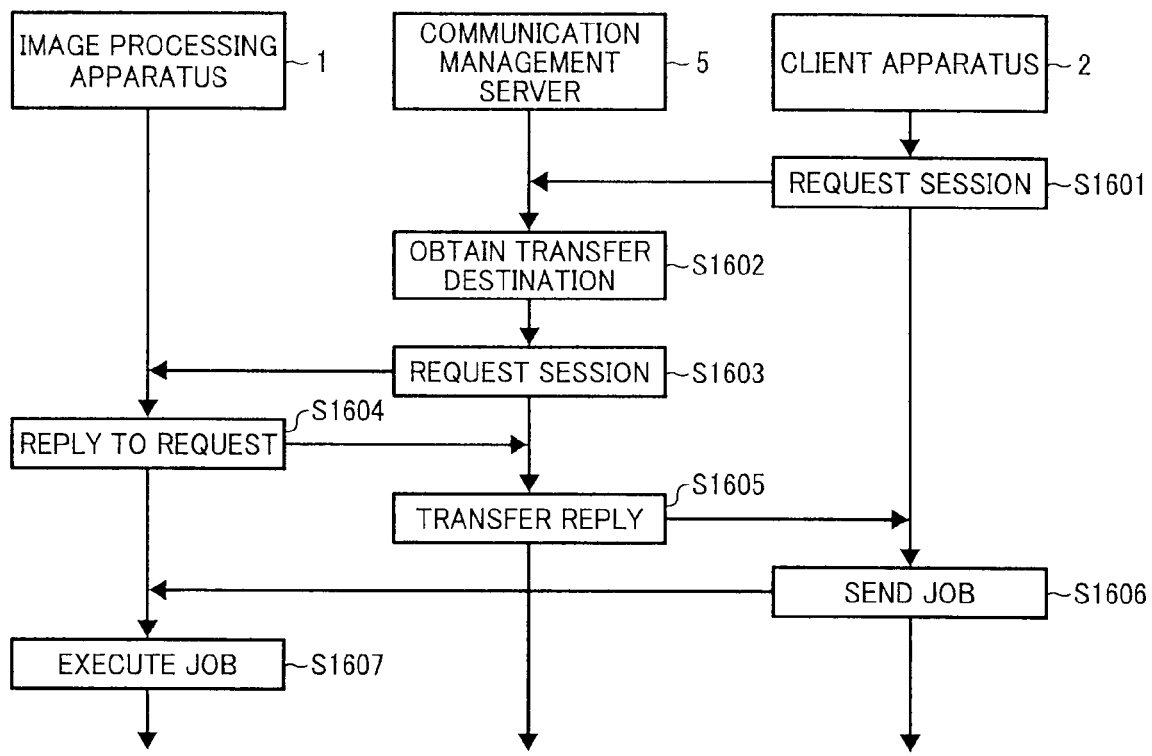
FIG. 16 is a sequence diagram illustrating an operation of the image processing system illustrated in FIG. 13.

Next, the operation performed when devices in the image processing system start communication is described with reference to FIG. 16. FIG. 16 shows an example of the operation performed when the client apparatus 2 sends a print job to the image processing apparatus 1. When sending the print job to the image processing apparatus 1, at S1601 the client apparatus 2 designates a distinction ID of the image processing apparatus 1 on the network to transmit a session request to the communication management server 5. The distinction ID designated at S1601 is, for example, the distinction ID (network address) illustrated in FIG. 15A. In such a case, the ID "printer1@callserver.***" is designated at S1601.

Receiving the session request from the client apparatus 2 via the network I/F 501, at S1602 the controller 500 of the communication management server 5 refers to the communication management information DB 511 and obtains the IP address of the image processing apparatus 1 as a destination to which the session request is transferred. At S1603 the communication management server 5 requests the session with the client apparatus 2 to the image processing apparatus 1.

Receiving the session request from the communication management server 5, at S1604 the image processing apparatus 1 replies to the session request. Thus, the session between the client apparatus 2 and the image processing apparatus 1 is established.

When the session is established, at S1606 the client apparatus 2 sends an entry request and a print job to the image processing apparatus 1. The image processing apparatus 1 performs a job in accordance with the print job received from the client apparatus 2, reports a detected event to a subscriber(s) associated with the event, and finished the job. Such a configuration allows relatively secure communication. Thus, in the configuration example illustrated in FIG. 14, the communication manager 503 of the controller 500 and the communication management information DB 511 serve as the communication management unit.

In the image processing system according to the present illustrative embodiment, the ESDB 121 of the image processing apparatus 1 is synchronized with the ESDB 512 of the communication management server 5. The synchronization of the ESDB 121 is executed when the image processing apparatus 1 is powered on. Further, the restriction information DB 122 of the image processing apparatus 1 is synchronized with the restriction information DB 513 of the communication management server 5. The operation of the image processing apparatus 1 performed when the power is turned on is described below with reference to FIG. 17.

Figure 17:
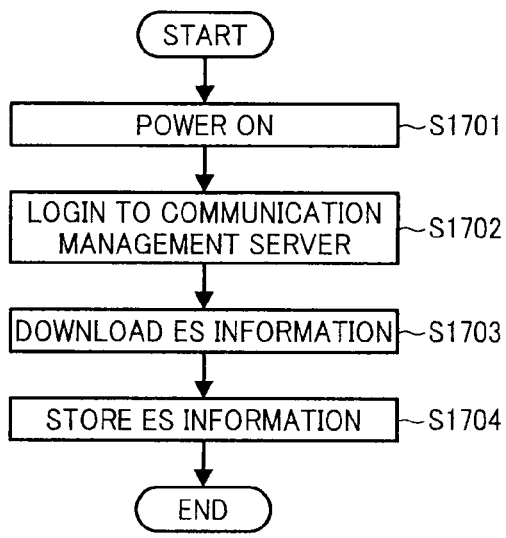

In FIG. 17, when the power is turned on at S1701, at S1702 the image processing apparatus 1 logs in the communication management server 5. Thus, as illustrated in FIG. 15A, information on the image processing apparatus 1 is entered in the communication management information DB 511 of the communication management server 5. The login processing of S1702 is executed by the input-and-output controller 113 operating in accordance with the control of the main controller 111.

When the login to the communication management server 5 is completed, at S1703 the image processing apparatus 1 downloads ES information on the image processing apparatus 1 itself from among ES information stored in the ESDB 512 of the communication management server 5. At S1704 the image processing apparatus 1 stores the downloaded ES information in the ESDB 121, and finishes the process. Thus, the synchronization between the ESDB 512 of the communication management server 5 and the ESDB 121 of the image processing apparatus 1 is completed.

The entry processing of the ESDB 121 in the image processing apparatus 1 is performed in the same manner as the processing of the illustrative embodiment 1 illustrated in FIG. 6. The controller 100 of the image processing apparatus 1 refers to the restriction information stored in the restriction information DB 122 to perform the processing illustrated in FIG. 6.

In the image processing system according to the present illustrative embodiment, the detection and reporting of events are performed in the same manner as those of the illustrative embodiment 1 illustrated in FIGS. 10 and 11. Devices in the image processing system communicate via the communication manager 503 of the communication management server 5.

As described above, in the image processing system according to the present illustrative embodiment, when communication according to a protocol such as SIP or XMPP is performed, the ESDB 121 is synchronized with the ESDB 512, allowing updating information.

The above-described illustrative embodiment describes the example in which synchronization of the ESDB 121 is performed when the image processing apparatus 1 is powered on.

When the image processing apparatus 1 is powered off, information entered in the ESDB 121 may be deleted, preventing past ES information from remaining in the ESDB 121. Such a configuration can be easily implemented by constituting the ESDB 121 with a volatile storage medium.

In the above-described illustrative embodiment, the example in which the communication management server 5 has capabilities of the communication management function illustrated in FIG. 16 and the ESDB 512. However, such capabilities involving the communication management and the ESDB 512 may be provided by separate service providers. In other words, such capabilities involving the communication management and the ESDB 512 may be implemented by separate servers. Alternatively, the image processing system may employ a configuration in which the above-described update processing is performed on the ESDB 121 of the image processing apparatus 1 instead of the ESDB 512.

Illustrative Embodiment 3

Figure 18:
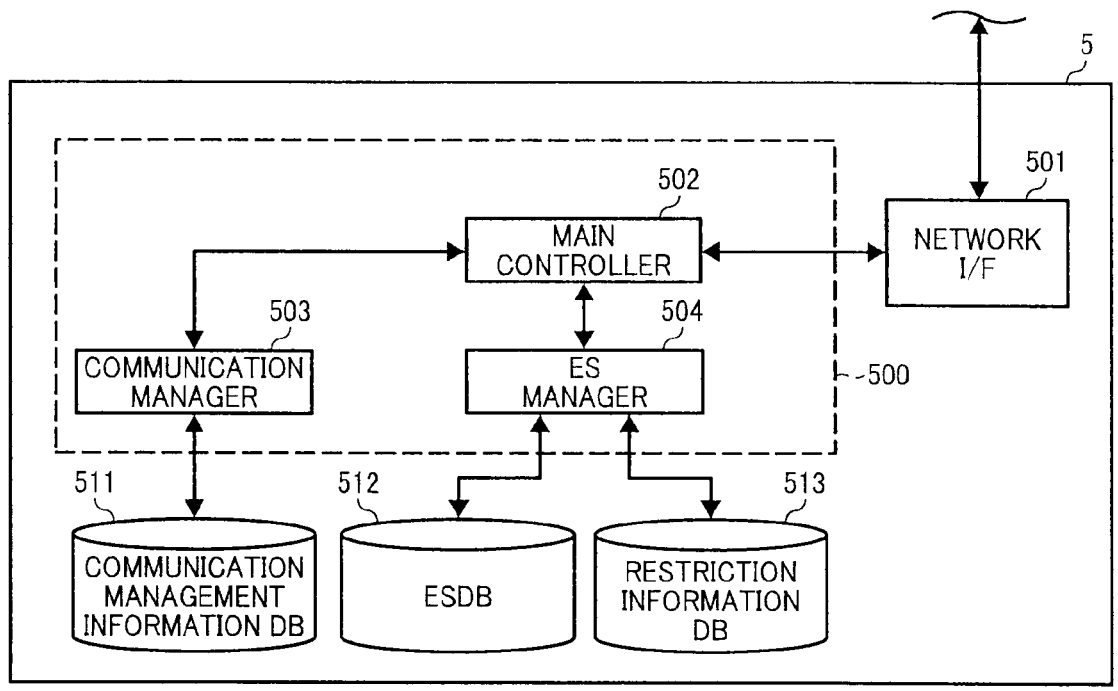
FIG. 18 is a block diagram illustrating a functional configuration of a communication management server provided in the image processing system.

Alternatively, the ESDB 121 may be omitted from the image processing apparatus 1 and instead the communication management server 5 may report events. Such a configuration is described below as a third illustrative embodiment with reference to FIG. 18. FIG. 18 is a block diagram illustrating a functional configuration of the communication management server 5 capable of reporting events. The communication management server 5 illustrated in FIG. 18 includes the controller 500, the main controller 502, the communication manager 503, and an ES manager 504.

The main controller 502 controls components of the controller 500. The communication manager 503 performs communication management illustrated in FIG. 16 while referring to the communication management information DB 511. The ES manager 504 reports events while referring to the ESDB 512 and the restriction information DB 513.

In the present illustrative embodiment, update processing is performed on the communication management server 5 instead of the image processing apparatus 1, allowing reduction of the processing load of the image processing apparatus 1. On the other hand, the communication management server 5 is constituted with hardware resources having a relatively large processing capacity to manage communication between a large number of devices connected via the network. Accordingly, with such a configuration, the update processing is not so much a burden to the communication management server 5, allowing effective use of the hardware resources.

Entry operation of ES information to the communication management server 5 is performed in the same manner as that of the entry operation with reference to FIGS. 6A and 6B. The controller 500 of the communication management server 5 refers to restriction information stored in the restriction information DB 513 to execute the processing illustrated in FIGS. 6A and 6B. In the image processing apparatus 1 which is a target for setting ES information, the operation detector 115 obtains information on whether an event is detectable to execute the processing of S603 in FIGS. 6A and 6B. Hence, the restriction information DB 513 stores information on events that the operation detector 115 of the image processing apparatus 1 can detect.

In the present illustrative embodiment, since the update processing of the ESDB 512 is not performed in the image processing apparatus 1, functions involving the update processing of the ESDB 121 described with reference to FIGS. 6A and 6B may be omitted from functions of the restriction information DB 122 and the operation detector 115 of the image processing apparatus 1.

Figure 19:
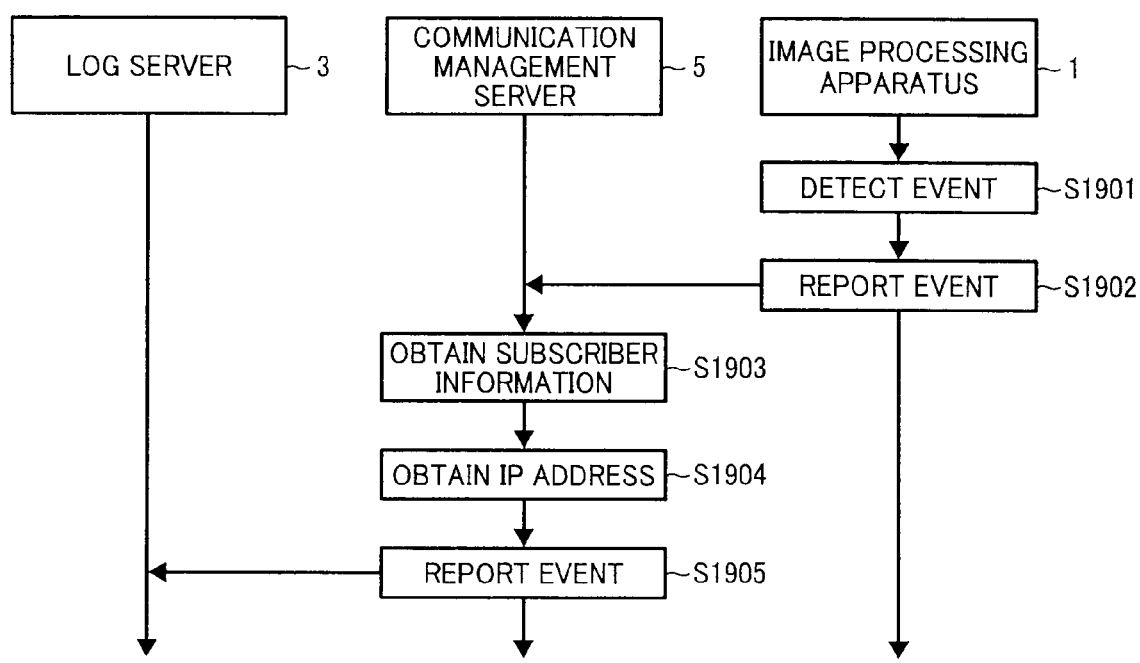
FIG. 19 is a sequence diagram illustrating an operation of the image processing system.

The report operation of the image processing system performed by the communication management server 5 illustrated in FIG. 18 is described with reference to FIG. 19. Entry processing of ES information or other information is performed in substantially the same manner as those of the above-described illustrative embodiments and a redundant description thereof is omitted below for the sake of simplicity. FIG. 19 is a sequence diagram illustrating an operation performed when an event detected in the image processing apparatus 1 is reported to the log server 3.

As illustrated in FIG. 19, at S1901 the operation detector 115 detects an event in the image processing apparatus 1. The operation detector 115 inputs the detected event to the main controller 111. At S1902 the main controller 111 controls the input-and-output controller 113 to report the event inputted from the operation detector 115 to the communication management server 5.

The event report inputted to the communication management server 5 is inputted to the ES manager 504 in accordance with the control of the main controller 502. Thus, in the present illustrative embodiment, the ES manager 504 serves as the operation detecting unit. By referring to the ESDB 512, at S1903 the ES manager 504 obtains subscriber information (distinction ID of a subscriber on the network) in the same manner as the processing of S1002 and S1003 illustrated in FIG. 10. The subscriber information obtained by the ES manager 504 is inputted to the communication manager 503 in accordance with the control of the main controller 502.

Based on the distinction ID of the input subscriber on the network, the communication manager 503 obtains an IP address of the subscriber from the communication management information DB 511. At this time, when information on a plurality of subscribers is reported, the communication manager 503 obtains a plurality of corresponding IP addresses. The communication manager 503 inputs the information of the obtained IP address(es) to the ES manager 504.

Obtaining the IP address of the subscriber, the ES manager 504 creates event report information by associating information on an event to be reported with the IP address of the subscriber and inputs the event report information to the main controller 502. Based on the event report information, at S1905 the main controller 502 reports the event to the designated IP address. Thus, the event report processing illustrated in FIG. 18 is completed.

As described above, performing the event report using the communication management server 5 allows further reduction of the amount of processing executed by the image processing apparatus 1. Further, in the example illustrated in FIG. 18, since the processing executed by the image processing apparatus 1 is to transmit the detected event to the communication management server 5, a relatively small number of functions may be added to the image processing apparatus 1, providing enhanced feasibility.

As illustrated in FIG. 19, in the configuration illustrated in FIG. 18, communication is performed through the intermediation of the communication management server 5 without waiting the establishment of a session as illustrated in FIG. 16. This is because the amount of information communicated at S1902 and S1905 is relatively small and the communication can be performed via a signaling channel to establish a session. Such a configuration allows reduction of the load of the network.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the scope of the present invention, and all such modifications are intended to be included within the scope of the present invention.

For example, elements and/or features of different illustrative embodiments may be combined with each other and/or substituted for each other within the scope of this disclosure and appended claims.

What is claimed is:

1. A status reporting apparatus for reporting a status of an image processing apparatus operating in connection with a network, the status reporting apparatus comprising:

a status detector configured to detect a status of a plurality of statuses of the image processing apparatus, the plurality of statuses including at least one status indicating completion of an operation by the image processing apparatus;

a status report destination information obtainer configured to obtain information on at least one report destination to which the status detected by the status detector is to be reported in accordance with status report destination information in which the status of the image processing apparatus is associated with the information on the at least one report destination;

an operation report destination information storage instruction unit configured to, when the image processing apparatus receives a job execution instruction and an entry request from a client apparatus, the job execution instruction to be executed by the image processing apparatus, the entry request including a report destination corresponding to the client apparatus, add additional status report destination information to the status report destination information in accordance with the received entry request including the report destination corresponding to the client apparatus, the additional status report destination information associating the report destination corresponding to the client apparatus with the job execution instruction and the status of the image processing apparatus; and a status reporting unit configured to report, when a status of the image processing apparatus associated with the execution of the job by the image processing apparatus is detected in response to progress of the job executed according to the job execution instruction, the status detected by the status detector to the at least one report destination obtained by the status report destination information obtainer, including the client apparatus in accordance with the additional status report destination information, wherein the status reporting apparatus selectively reports a plurality of types of statuses or process stages of at least one image processing apparatus to at least one report destination, the status detector detects the plurality of types of statuses and process stages of the at least one image processing apparatus, the status report destination information obtainer obtains, in accordance with the types of statuses or progress stages detected by the status detector, information on at least one report destination to which each of the plurality of types of statuses or process stages detected by the status detector is to be reported by referring to status report destination information in which each of the plurality of types of statuses or progress stages is associated with the information on the at least one report destination, the status reporting unit reports each of the plurality of types of statuses or progress stages detected by the status detector to the at least one report destination on which the information is obtained by the status report destination information obtainer, and the status of the image processing apparatus is organized into a hierarchy of categories by conceptual level, and specification in the status report destination information of a status of a concept level higher than a concept level of a status detected by the status detector causes the status report destination information obtainer to obtain information on all report destinations associated with all lower-concept-level statuses categorized under the higher concept level status specified in the status report destination information.

2. The status reporting apparatus according to claim 1, further comprising a status report destination information storage unit configured to store the status report destination information, wherein the status report destination information obtainer obtains the information on the at least one report destination from the status report destination information storage unit in accordance with the status of the image processing apparatus detected by the status detector.

3. The status reporting apparatus according to claim 1, further comprising a status report destination information updater to update the status report destination information stored in the status report destination information storage unit in accordance with inputted update information.

4. The status reporting apparatus according to claim 3, further comprising:

an update restriction unit to restrict updating of the status report destination information performed by the status report destination information updater; and an update restriction information storage unit to store update restriction information with which the update restriction unit determines whether a user is authorized to update the status report destination information, wherein the update restriction unit restricts the updating of the status report destination information by the status report destination information updater in accordance with the inputted update information and the update restriction information.

5. The status reporting apparatus according to claim 4, wherein the update restriction information includes information in which the user is associated with update authority information indicating an update authority of the user, the update information includes user information on the user instructing the updating of the status report destination information, and the update restriction unit obtains the update authority information from the update restriction information storage unit to restrict the updating of the status report destination information.

6. The status reporting apparatus according to claim 4, wherein the update restriction information includes information in which apparatus status information indicating the status of the image processing apparatus is associated with status update authority information indicating an update authority of the user for the status detected by the status detector, the update information includes user information on the user instructing the updating of the status report destination information and the apparatus status information indicating the status of the image processing apparatus, and the update restriction unit obtains the status update authority information associated with the apparatus status information from the restriction information storage unit to restrict the updating of the status report destination information.

7. The status reporting apparatus according to claim 4, wherein the update restriction information includes detectable status information on a status of the image processing apparatus detectable with the status detector, the update information includes apparatus status information indicating the status of the image processing apparatus, and the update restriction unit restricts the updating of the status report destination information when the state of the image processing apparatus indicated by the update information is not detectable with the status detector.

8. The status reporting apparatus according to claim 1, wherein the status report destination information obtainer stores information indicating a hierarchical structure with a plurality of concept levels regarding the status of the image processing apparatus and obtains the information on the report destinations in accordance with the information indicating the hierarchical structure.

9. The status reporting apparatus according to claim 1, wherein the status reporting apparatus is integrally configured with the image processing apparatus.

10. An image processing system, comprising:

an image processing apparatus operating in connection with a network; and a status reporting apparatus to detect and report a status of the image processing apparatus, the status reporting apparatus comprising:

an operation detector configured to detect a status of a plurality of statuses of an operation of the image processing apparatus, the plurality of statuses including at least one status indicating completion of the operation by the image processing apparatus;

an operation report destination information storage unit configured to store operation report destination information in which the status of the operation of the image processing apparatus is associated with information on a report destination to which the status of the operation is to be reported;

an operation report destination information storage instruction unit configured to, when the image processing apparatus receives a job execution instruction and an entry request from a client apparatus, the job execution instruction to be executed by the image processing apparatus, the entry request including a report destination corresponding to the client apparatus, add additional operation report destination information to the operation report destination information in accordance with the received entry request including the report destination corresponding to the client apparatus, the additional operation report destination information associating the report destination corresponding to the client apparatus with the job execution instruction and the status of the image processing apparatus;

an operation report destination information obtainer configured to obtain the information on the report destination to which the status of the operation of the image processing apparatus detected by the operation detector is to be reported in accordance with the operation report destination information; and an operation report unit configured to report, when a status of the operation of the image processing apparatus associated with the execution of the job by the image processing apparatus is detected in response to progress of the job executed according to the job execution instruction, the status of the operation detected by the operation detector to the report destination obtained by the operation report destination information obtainer, including the client apparatus in accordance with the additional operation report destination information, wherein the status reporting apparatus selectively reports a plurality of types of statuses or process stages of at least one image processing apparatus to at least one report destination, the operation detector detects the plurality of types of statuses and process stages of the at least one image processing apparatus, the operation report destination information obtainer obtains, in accordance with the types of statuses or progress stages detected by the operation detector, information on at least one report destination to which each of the plurality of types of statuses or process stages detected by the operation detector is to be reported by referring to operation report destination information in which each of the plurality of types of statuses or progress stages is associated with the information on the at least one report destination, the operation report unit reports each of the plurality of types of statuses or progress stages detected by the operation detector to the at least one report destination on which the information is obtained by the operation report destination information obtainer, and the status of the image processing apparatus is organized into a hierarchy of categories by conceptual level, and specification in the operation report destination information of a status of a concept level higher than a concept level of a status detected by the operation detector causes the operation report destination information obtainer to obtain information on all report destinations associated with all lower-concept-level statuses categorized under the higher concept level status specified in the operation report destination information.

11. The image processing system according to claim 10, further comprising:

an execution instruction sender configured to send the job execution instruction of image processing to the image processing apparatus, wherein the operation report destination information storage instruction unit instructs the operation report destination information storage unit to store, when the job execution instruction is sent, information on the image processing according to the job execution instruction and a report destination to which an execution of the image processing is to be reported, wherein the operation report destination information storage unit stores the information on the image processing according to the job execution instruction in association with the information on the report destination in response to an instruction of the operation report destination information storage instruction unit, the operation detector detects the execution of the image processing according to the job execution instruction, the operation report destination information obtainer obtains the information on the report destination from the operation report destination information storage unit, and the operation report unit reports the execution of the image processing to the report destination obtained.

12. The image processing system according to claim 10, further comprising a communication management apparatus including a communication manager configured to manage communication in the image processing system and an operation report destination information manager to manage the operation report destination information, wherein the operation report destination information storage unit obtains the operation report destination information from the operation report destination information manager to store the operation report destination information therein.

13. The image processing system according to claim 12, further comprising a communication start unit configured to start communication with another device in the image processing system by accessing the communication management apparatus when the another device is powered on, wherein the operation report destination information storage unit obtains the operation report destination information from the operation report destination information manager in response to the start of the communication.

14. The image processing system according to claim 10, wherein the status reporting apparatus is integrally configured with the image processing apparatus.

15. A non-transitory computer-readable storage medium storing computer-readable instructions thereon which, when executed by a computer, cause the computer to execute a method of operating as a status reporting apparatus that reports a status of an image processing apparatus operating in connection with a network to a report destination connected via the network, the image processing apparatus comprising a status detector to detect the status of the image processing apparatus, the method comprising:

- detecting a status of a plurality of statuses of the image processing apparatus with the status detector, the plurality of statuses including at least one status indicating completion of an operation by the image processing apparatus;
- obtaining information on a report destination to which a status detected by the status detector is to be reported in accordance with status report destination information in which the status of the image processing apparatus is associated with the information on the report destination;
- adding, when the image processing apparatus receives a job execution instruction and an entry request from a client apparatus, the job execution instruction to be executed by the image processing apparatus, the entry request including a report destination corresponding to the client apparatus, additional status report destination information to the status report destination information in accordance with the received entry request including the report destination corresponding to the client apparatus, the additional status report destination information associating the report destination corresponding to the client apparatus with the job execution instruction and the status of the image processing apparatus; and
- reporting, when a status of the image processing apparatus associated with the execution of the job by the image processing apparatus is detected in response to progress of the job executed according to the job execution instruction, the status of the image processing apparatus detected by the detecting to the report destination obtained by the obtaining, including the client apparatus in accordance with the additional status report destination information, wherein the status reporting apparatus selectively reports a plurality of types of statuses or process stages of at least one image processing apparatus to at least one report destination, the status detector detects the plurality of types of statuses and process stages of the at least one image processing apparatus, the obtaining includes obtaining, in accordance with the types of statuses or progress stages detected by the status detector, information on at least one report destination to which each of the plurality of types of statuses or process stages detected by the status detector is to be reported by referring to status report destination information in which each of the plurality of types of statuses or progress stages is associated with the information on the at least one report destination, the reporting includes reporting each of the plurality of types of statuses or progress stages detected by the status detector to the at least one report destination on which the information is obtained by the obtaining, and the status of the image processing apparatus is organized into a hierarchy of categories by conceptual level, and specification in the status report destination information of a status of a concept level higher than a concept level of a status detected by the status detector causes the obtaining to obtain information on all report destinations associated with all lower-concept-level statuses categorized under the higher concept level status specified in the status report destination information.

16. The status reporting apparatus according to claim 1, further comprising a status report destination information storage unit configured to store status report destination information in which each of the plurality of statuses of the image processing apparatus is associated with information on at least one report destination.

17. The status reporting apparatus according to claim 16, wherein the status detector obtains the status of the image processing apparatus from the image processing apparatus via the network.

18. The status reporting apparatus according to claim 17, wherein the status report destination information obtainer obtains information on at least one report destination associated with the status detected by the status detector, based on the status report destination information stored in the status report destination information storage unit.

* * * * *